United States Patent [19]

Powers et al.

[11] Patent Number: 4,584,485

[45] Date of Patent: Apr. 22, 1986

[54] OPTICAL BLOCK IN SMOKE DETECTORS

[75] Inventors: Robert B. Powers, Norwell; Donald Adams, West Bridgewater; Angelo A. Marsocci, Duxbury, all of Mass.

[73] Assignee: American District Telegraph Company, Jersey City, N.J.

[21] Appl. No.: 524,994

[22] Filed: Aug. 22, 1983

[51] Int. Cl.$^4$ .............................................. G01N 15/06

[52] U.S. Cl. .................................... 250/574; 250/239

[58] Field of Search ................ 356/338, 438; 250/573, 250/574, 239; 340/630

[56] References Cited

U.S. PATENT DOCUMENTS

| | | | |
|---|---|---|---|
| 4,129,383 | 12/1978 | Malinowski | 250/574 |
| 4,206,366 | 6/1980 | Marsocci et al. | 250/574 |
| 4,315,158 | 2/1982 | Kakigi et al. | 250/239 |
| 4,459,054 | 7/1984 | Köhr | 340/630 |

*Primary Examiner*—David C. Nelms
*Assistant Examiner*—Michael Messinger
*Attorney, Agent, or Firm*—James H. Grover

[57] ABSTRACT

An optical block for the exciter lamp and photocell includes a base with a first seat holding the lamp on a first optical axis and a second seat holding the cell on an intersecting optical axis. A cover with two light passages along the axes has a socket into which the base snap fits to confine the lamp and cell in their seats.

14 Claims, 6 Drawing Figures

OPTICAL BLOCK IN SMOKE DETECTORS

BACKGROUND

The invention relates to smoke detectors of the type shown in U.S. Pat. No. 3,863,076 wherein the optical components of the detector, namely an exciter lamp and a photocell, are enclosed within a block pre-assembled around the cell and lamp and forming light passages on optical axes. The axes cross outside the block at an intersection where light from the lamp is scattered by smoke back to the cell. Herein photocell and lamp are meant to include all electrically photoresponsive tubes and solid state devices and all sources of light in the visible and adjacent spectrum including incandescent, discharge and solid state devices.

It is the object of the present invention to provide an improved optical block in which the photocell and lamp are most simply assembled in the optical block and mounted on a circuit board in the smoke detector.

SUMMARY OF THE INVENTION

According to the invention an optical block for a smoke detector comprises a base having a first seat shaped to receive and locate a lamp in a position on a first axis, and a second seat for locating a photocell in a position on a second axis intersecting the first axis; a cover forming two light passages along the intersecting axes shielding the photocell position from the lamp position, the cover having a socket shaped to receive the base, and interengaging means holding the base and cover attached to each other.

In another aspect the optical block is combined with a frame including a screen forming with the frame a smoke permeable enclosure fitting on the block. Preferably both the block and enclosure have snap fit means engaging a circuit board to hold the enclosure frame fitted on the block and board.

DRAWINGS

DESCRIPTION

Figure 1:
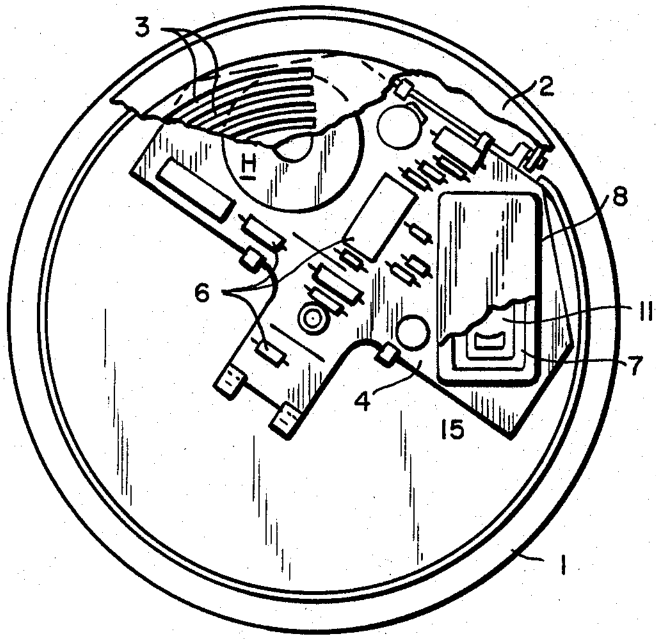
FIG. 1 is a plan view of a smoke detector, partly broken away to show an optical block and screened enclosure according to the invention.

FIG. 1 shows a smoke detector comprising a circular base 1 on which a cover 2 with louvre openings 3 is detachably fitted. The cover is broken away to show a printed circuit board 4 carrying components 6 of an electronic circuit which processes photoelectric signals from an optical block 7 to sound an alarm H upon the detection of a significant density of smoke.

Figure 2:
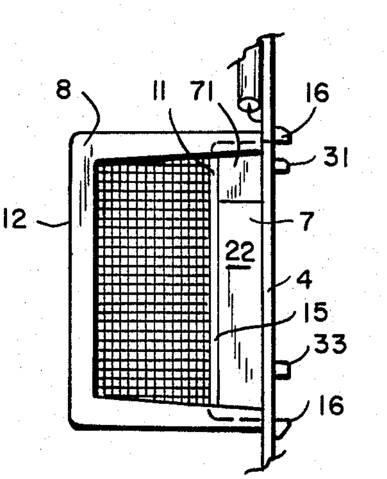
FIG. 2 is an enlarged side elevation of the optical block and screened enclosure.
Figure 3:
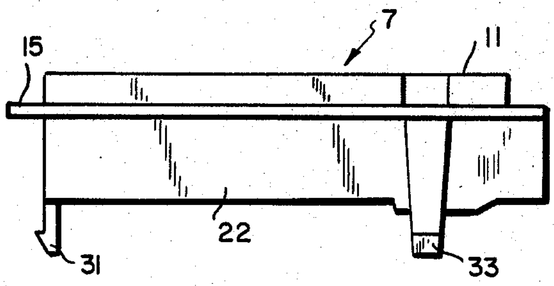
FIG. 3 is a further enlarged side elevation of the optical block.
Figure 4:
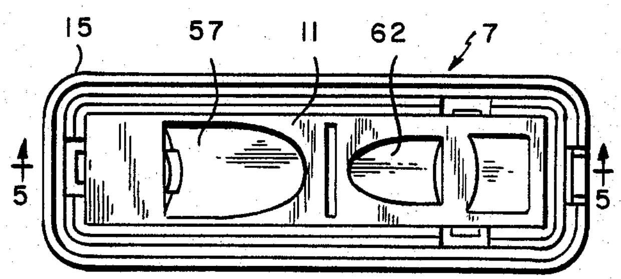
FIG. 4 is a plan view of the optical block on the scale of FIG. 3.
Figure 5:
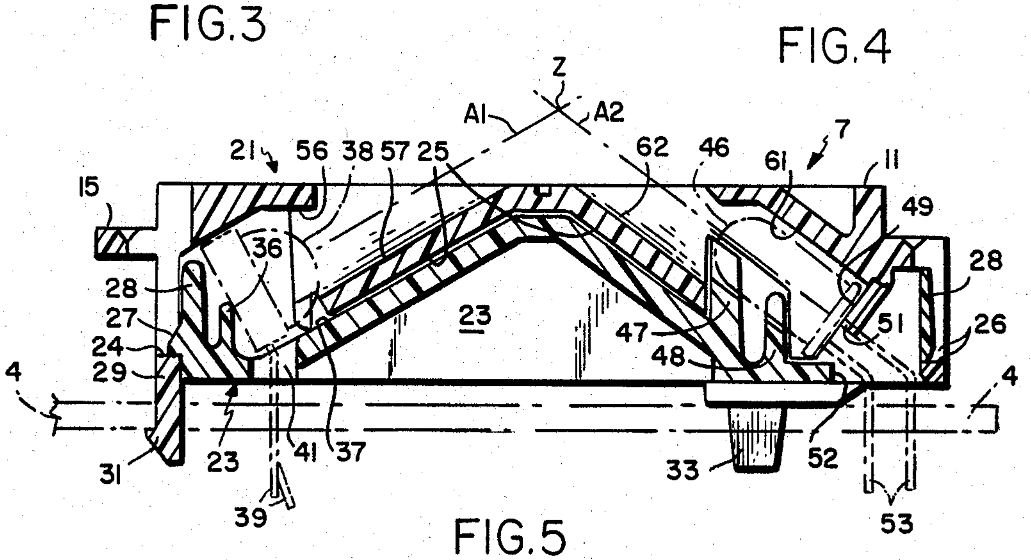
FIG. 5 is a section, enlarged, on lines 5—5 of FIG. 4.
Figure 6:
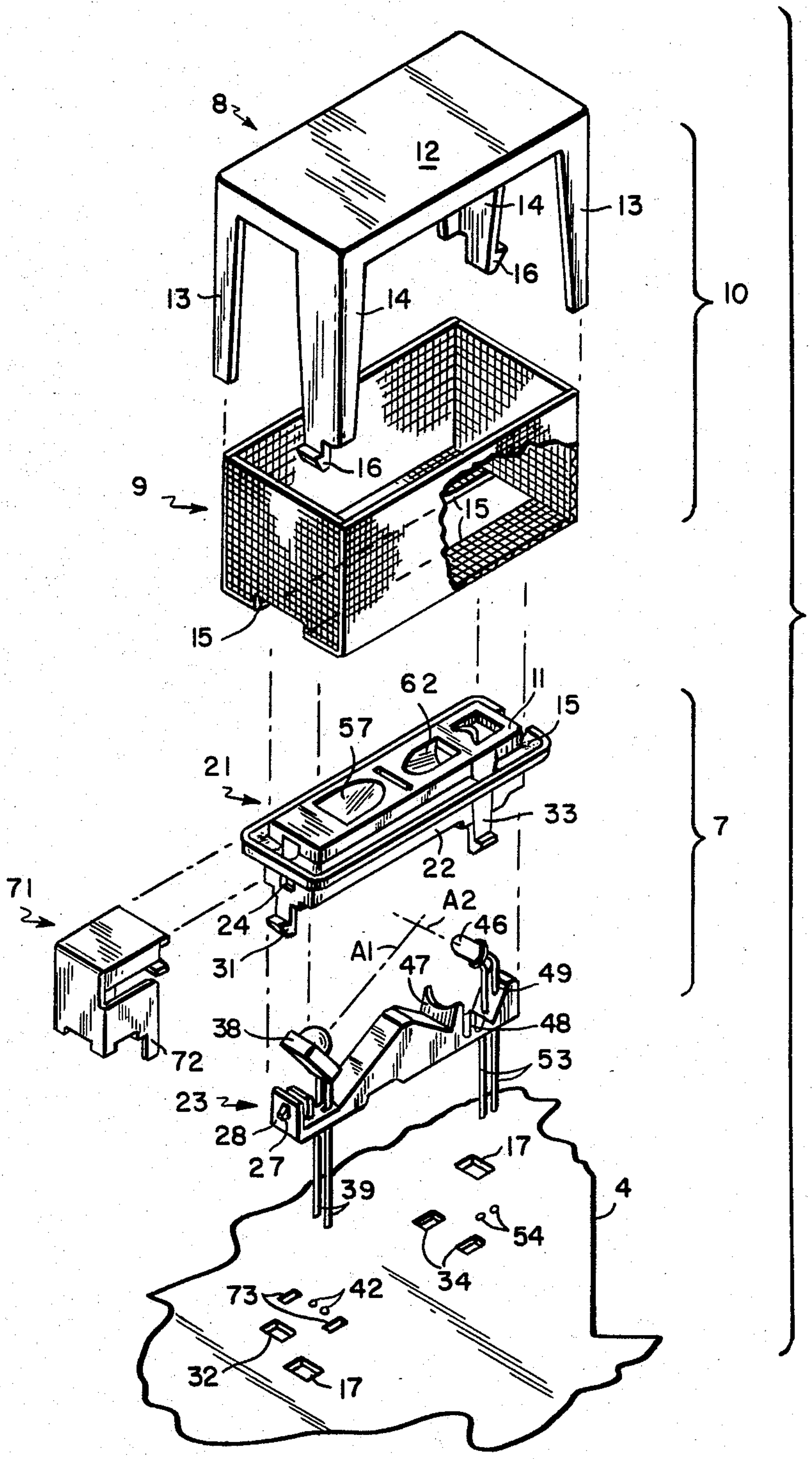
FIG. 6 is an exploded isometric view of the optical block and screened enclosure.

As shown in FIGS. 1, 2 and 5 the optical block 7 is covered by a frame 8 holding a screen 9 together forming a smoke permeable enclosure 10 over the top side 11 of the block. The frame has a top 12 closing the top of the box shaped screen 9 which has at its bottom a rectangular opening 15 matching and fitting the top side 11 against a shelf 15 of the optical block to exclude insects from inside the enclosure while permitting ready flow of air into the enclosure. The top 12 of the enclosure shields the optical block from most ambient light entering through the louvres 3 and other openings in the detector cover 2. The frame 8 is of plastic and has two legs 13 which stand on the circuit board 4, and two legs 14 with detents 16 which snap fit through rectangular holes 17 in the circuit board and engage the underside of the board in opposition to the other legs 14 pressing on the top of the board. The screen 9 slide fits within the four legs of the frame confined between the top 12 of the frame and the optical block 7.

The optical block 7 shown in detail in FIGS. 3 to 6 comprises a generally rectangular cover 21 of black plastic such as thermoplastic resin with the previously mentioned top side 11 and a skirt 22 on four sides telescoping completely over a base 23 of like material. The underside of the cover 21 forms a socket 25 with an inverted V cross section receiving the complementary upper portion of the base 23. At opposite ends of the cover are openings 24 and 26 into which fit detents 27 and 28 at corresponding ends of the base. One detent 27 is on a thin flexible end wall 28 which, after the other base detent 28 is engaged in the cover opening 26, snap fits into the cover opening 24. At this end of the cover is a tab 29 with a detent 31 snap fitting in a hole 32 in the circuit board 4. Similar tabs 33 at the other end of the cover snap fit in circuit board holes 34 structurally to attach the cover and base to the board.

The optical block base 23 has at one end the detent tab 28, an adjacent upstanding tab 36 and an upwardly facing sloping wall 37 which form a seat for a photocell 38 with leads 39, preferably an infrared sensitive photodiode. Openings 41 through the wall 37 of the base admit leads to and through matching holes 42 in the circuit board. At the other end of the base is a seat for a light emitting diode 46, preferably infrared light emitting, the seat being formed by upright notched tongues 47 and 48 and an inclined wall 49. An opening 51 through the wall 49 and an opening 52 through the base 23 pass lamp leads 53 through holes 54 circuit board 4.

The seats align the photodiode 38 and the LED 46 on optical axes A1 and A2 respectively which cross at an intersection zone Z.

The optical block cover has at one end an upper wall 56 opposite a semicylindrical wall 57 whose underside forms part of the socket 25 receiving the base 23. The walls 56 and 57 form a generally cylindrical light passage around the photocell axis A1. Similarly at the opposite end of the cover are upper wall 61 and opposite a semi-cylindrical wall 62 form a generally cylindrical light passage around the optical axis A2 of the LED 46. Both passages open at the top 11 of the optical block adjacent the intersection zone Z. When smoke flows through the louvres 3 and other openings in the smoke detector cover 2 to the intersection zone Z within the screened enclosure above the optical block, light from the LED beam is scattered along the first axis A1 to the cell 38. If the smoke is of a predetermined density an alarm signal is generated.

The principle advance of the present optical block is its ease of assembly and mounting on a circuit board. The photocell 38 and LED 46 when placed in their respective seats on the base 23 will hold in place while the base 23 is snap fitted in the socket 25 of the cover wherein the upper walls 56 and 61 confine the lamp in position on the optical axes A1 and A2 with the cell and lamp leads 39 and 53 aligned for insertion in the circuit board openings. All this fitting is done manually without separate fasteners. A metallic shield 71 for the photodiode 38 may then be slipped endwise on the block and the optical block assembly attached to the circuit board with its various leads fitting in the circuit board holes previously described, and tabs 72 on the shield 71 extending through holes 73 in the board. The leads and shield tabs may then be wave soldered at the underside of the board. Thereafter the enclosure 10 is snap fitted on the board completing assembly of the lamp and cell in the optical block and mounting of the block and screened enclosure on the circuit board without additional mechanical fastening other than the necessary soldering of electrical connectors to the lamp, cell and shield.

It should be understood that the present disclosure is for the purpose of illustration only and that this invention includes all modifications and equivalents which fall within the scope of the appended claims.

We claim:

1. An optical block for a smoke detector comprising:

a base having a first seat shaped to receive and locate a lamp in a position on a first light axis, and a second seat for locating a photocell in a position on a second light axis, the second axis intersecting the first axis;

a cover forming two light passages along the intersecting axes shielding the photocell position from the lamp position, the cover having a socket shaped to receive the base, and interengaging means holding the base and cover attached to each other.

2. A block according to claim 1 wherein the interengaging means are resilient for snap fitting attachment of the base and cover.

3. A block according to claim 1 wherein the cover socket includes restraining means adjacent the lamp and photocell positions and opposed to the first and second seats of the base for holding the lamp and cell in position.

4. A block according to claim 1 wherein the cover socket includes a skirt telescoping over the base.

5. A block according to claim 1 including tabs at one side for mounting the block on a circuit board.

6. A block according to claim 5 wherein the base has an aperture at one seat admitting a lead from the lamp or photocell through the base to the circuit board side of the base.

7. A block according to claim 6 wherein the base has apertures at both seats for both lamp and photocell leads.

8. A block according to claim 1 in combination with a circuit board having electrical connections to the photocell and lamp.

9. A block according to claim 8 including snap fitting means attaching the block on the board.

10. A block according to claim 1 in combination with a frame including a screen forming with the frame a smoke permeable enclosure fitting over the cover side of the block.

11. A block according to claim 10 in combination with a circuit board wherein the frame has snap fit means extending through and engaging the circuit board to hold the enclosure fitted on the block.

12. A block according to claim 9 wherein the frame has snap fit means extending through and engaging the circuit board to hold the enclosure fitted on the block.

13. A smoke detector assembly comprising:

a circuit board;

an optical block anchored on the board, the block including a lamp and a photocell positioned at respective seats in the block on intersecting axes extending along passages in the block shielding the cell from the lamp; and a frame including a screen forming a smoke permeable enclosure fitting on the block, the frame having snap fit means engaging the board to hold the enclosure fitted on the block.

14. A smoke detector assembly according to claim 13 including snap fitting means attaching the block on the board.

* * * * *